(12) United States Patent
Nowak-Przygodzki et al.

(10) Patent No.: US 12,175,747 B2
(45) Date of Patent: *Dec. 24, 2024

(54) SYSTEMS, METHODS, AND APPARATUS FOR IMAGE-RESPONSIVE AUTOMATED ASSISTANTS

(71) Applicant: GOOGLE LLC, Mountain View, CA (US)

(72) Inventors: Marcin Nowak-Przygodzki, Bäch (CH); Gökhan Bakir, Zurich (CH)

(73) Assignee: GOOGLE LLC, Mountain View, CA (US)

(*) Notice: Subject to any disclaimer, the term of this patent is extended or adjusted under 35 U.S.C. 154(b) by 190 days.

This patent is subject to a terminal disclaimer.

(21) Appl. No.: 17/888,163

(22) Filed: Aug. 15, 2022

(65) Prior Publication Data

US 2022/0392216 A1    Dec. 8, 2022

Related U.S. Application Data

(63) Continuation of application No. 16/806,505, filed on Mar. 2, 2020, now Pat. No. 11,417,092, which is a (Continued)

(51) Int. Cl.
*G06V 20/20* (2022.01)
*G06F 3/01* (2006.01)
(Continued)

(52) U.S. Cl.
CPC .............. *G06V 20/20* (2022.01); *G06F 3/011* (2013.01); *G06F 3/014* (2013.01); *G06F 3/0482* (2013.01);
(Continued)

(58) Field of Classification Search
CPC ..................................................... G06Q 50/00
See application file for complete search history.

(56) References Cited

U.S. PATENT DOCUMENTS 9,208,177 B2 * 12/2015 Petrou ............... G06F 16/24578
10,185,898 B1 * 1/2019 Folkens ................. G06V 20/20
(Continued)

FOREIGN PATENT DOCUMENTS

CN         105094311       11/2015
CN         106155465       11/2016
(Continued)

OTHER PUBLICATIONS

European Patent Office; Decision to Refuse a European Patent Application issued in Application No. 18786452.5. 13 pages, dated Nov. 11, 2022.
(Continued)

*Primary Examiner* — Soo Shin
(74) *Attorney, Agent, or Firm* — Gray Ice Higdon

(57) ABSTRACT

Techniques described herein enable a user to interact with an automated assistant and obtain relevant output from the automated assistant without requiring arduous typed input to be provided by the user and/or without requiring the user to provide spoken input that could cause privacy concerns (e.g., if other individuals are nearby). The assistant application can operate in multiple different image conversation modes in which the assistant application is responsive to various objects in a field of view of the camera. The image conversation modes can be suggested to the user when a particular object is detected in the field of view of the camera. When the user selects an image conversation mode, the assistant application can thereafter provide output, for presentation, that is based on the selected image conversation mode and that is based on object(s) captured by image (s) of the camera.

20 Claims, 8 Drawing Sheets

Related U.S. Application Data continuation of application No. 15/700,106, filed on Sep. 9, 2017, now Pat. No. 10,607,082.

(51) Int. Cl.

| | |
|---|---|
| *G06F 3/0482* | (2013.01) |
| *G06F 3/04886* | (2022.01) |
| *G06F 16/487* | (2019.01) |
| *G06F 16/9032* | (2019.01) |
| *G06Q 30/02* | (2023.01) |
| *G06V 20/68* | (2022.01) |
| *H04N 23/63* | (2023.01) |
| *H04N 23/667* | (2023.01) |

(52) U.S. Cl.
CPC ........ *G06F 3/04886* (2013.01); *G06F 16/487* (2019.01); *G06F 16/9032* (2019.01); *G06Q 30/02* (2013.01); *G06Q 30/0281* (2013.01); *H04N 23/63* (2023.01); *H04N 23/667* (2023.01); *G06V 20/68* (2022.01); *G06V 2201/07* (2022.01); *G06V 2201/08* (2022.01)

(56) References Cited

U.S. PATENT DOCUMENTS

| | | | | |
|---|---|---|---|---|
| 11,417,092 | B2* | 8/2022 | Nowak-Przygodzki | ..................... G06Q 30/0281 |
| 2002/0140745 | A1* | 10/2002 | Ellenby | ................. G06F 1/1684 715/848 |
| 2005/0261910 | A1* | 11/2005 | Precoda | .................. G06F 40/58 704/277 |
| 2006/0161379 | A1* | 7/2006 | Ellenby | .................. G06F 16/29 702/150 |
| 2013/0044132 | A1* | 2/2013 | Athsani | ................. G06F 16/487 345/633 |
| 2014/0152882 | A1* | 6/2014 | Samek | .................. G06Q 10/08 348/333.02 |
| 2014/0362111 | A1 | 12/2014 | Kim | |
| 2015/0186156 | A1* | 7/2015 | Brown | .................... H04L 51/02 715/706 |
| 2016/0004306 | A1 | 1/2016 | Maltz | |
| 2016/0041388 | A1 | 2/2016 | Fujimaki et al. | |
| 2016/0091964 | A1 | 3/2016 | Iyer | |
| 2016/0283564 | A1* | 9/2016 | Sharon | ................ G06F 16/2453 |
| 2016/0283595 | A1* | 9/2016 | Folkens | .................. G06F 16/51 |
| 2017/0147154 | A1 | 5/2017 | Steiner | |
| 2017/0311053 | A1* | 10/2017 | Ganjam | ................. G06V 20/20 |
| 2019/0026939 | A1* | 1/2019 | Frankel | ..................... G06T 7/70 |
| 2019/0080169 | A1* | 3/2019 | Nowak-Przygodzki | ..................... G06V 20/20 |
| 2020/0202130 | A1* | 6/2020 | Nowak-Przygodzki | ..................... H04N 23/63 |
| 2021/0081093 | A1* | 3/2021 | Yun | .................... G06F 3/04842 |

FOREIGN PATENT DOCUMENTS

| | | |
|---|---|---|
| CN | 106937531 | 7/2017 |
| EP | 2595070 | 5/2013 |
| JP | 2006146454 | 6/2006 |
| JP | 2009301248 | 12/2009 |
| JP | 2012059263 | 3/2012 |
| JP | 2013211027 | 10/2013 |
| JP | 2014116852 | 6/2014 |
| JP | 2016206447 | 12/2016 |
| KR | 20130137063 | 12/2013 |

OTHER PUBLICATIONS

China National Intellectual Property Administration; Grant Notice issued in Application No. 201880038695.9; 6 pages; dated Sep. 3, 2023.
China National Intellectual Property Administration; Notification of First Office Action issued in Application No. 201880038695.9; 32 pages; dated Mar. 30, 2023.
Japanese Patent Office; Notice of Reasons for Rejection issued in Application No. 2022074840; 8 pages; dated Oct. 30, 2023.
European Patent Office; Preliminary Opinion issued in Application No. 18786452.5. 4 pages, dated Sep. 21, 2022.
European Patent Office; Summons to Attend Oral Proceedings pursuant to Rule 115(1) issued in Application No. 18786452.5, 9 pages, dated May 17, 2022.
Japanese Patent Office; Decision of Rejection issued in Application No. 2019-568378; 7 pages; dated Jan. 4, 2022.
Korean Patent Office; Office action issue in Application No. KR1020217927310; 13 pages; dated Nov. 17, 2021.
Japanese Patent Office; Notice of Reasons for Rejection issued in Application No. 2019-568378; 9 pages; dated Jun. 21, 2021.
Korean Patent Office; Notice of Allowance issue in Application No. KR1020197036386; 3 pages; dated May 26, 2021.
Japanese Patent Office; Notice of Reasons for Rejection issued in Application No. 2019-568378; 9 pages; dated Mar. 8, 2021.
European Patent Office; Communication Pursuant to Article 94(3) EPC issued in Application No. 18786452.5; 8 pages; dated Feb. 18, 2021.
Korean Patent Office; Office action issue in Application No. KR1020197036386; 39 pages; dated Dec. 7, 2020.
Google Developers; "Google I/O (Google I/O '17)", YouTube; Retrieved from internet: URL:https://www.youtube.com/watch?v=Y2VF8tmLFHw [retrieved on Nov. 12, 2018] *especially sections regarding Google Lens, e.g. from 24mn20s to 27mn04*; 4 pages dated May 17, 2017.
European Patent Office, International Search Report and Written Opinion of PCT Ser. No. PCT/US2018/050047; 15 pages; dated Nov. 26, 2018.
Letter of the Applicant filed in Application No. 18786452.5, 19 pages, dated Jun. 28, 2021.
Korean Patent Office; Notice of Allowance issue in Application No. KR1020217027310; 3 pages; dated Apr. 11, 2022.
Japanese Patent Office; Notice of Reasons for Rejection issued in Application No. 2022-074840; 8 pages; dated Jun. 19, 2023.

* cited by examiner

SYSTEMS, METHODS, AND APPARATUS FOR IMAGE-RESPONSIVE AUTOMATED ASSISTANTS

BACKGROUND

Humans may engage in human-to-computer dialogs with interactive software applications referred to herein as "automated assistants" (also referred to as "digital agents," "chatbots," "assistant applications," "interactive personal assistants," "intelligent personal assistants," "conversational agents," etc.). For example, humans (which when they interact with automated assistants may be referred to as "users") may provide commands and/or requests using (i) spoken natural language input (i.e. utterances), which may in some cases be converted into text and then processed, and/or (ii) by providing textual (e.g., typed) natural language input. Certain automated assistants can provide information (e.g., movie times, store hours, etc.) in response to voice commands from a user, and/or control peripheral devices according to the voice commands. Although such features are convenient, there may be ways of providing more elaborate commands, providing commands with less arduous inputs, providing commands that protect the privacy of a corresponding user, and/or providing commands with additional or alternative benefits.

SUMMARY

Implementations disclosed herein relate to generating output that is tailored to attribute(s) of objects captured in image(s), from a camera of a client device, and causing the tailored output to be rendered (e.g., audibly and/or graphically) at the client device, optionally along with (e.g., graphically overlaid on) a presentation of a real-time image feed from the camera. In various implementations, at least one image captured by the camera is processed to determine one or more attributes of objects captured by the image. Further, a subgroup of one or more conversation modes is selected, from a group of a plurality of available conversation modes, based on one or more of the determined attributes. Selectable element(s) that correspond to the conversation mode(s) of the subgroup are then caused to be displayed, at an interface of the client device, as initial output. In this manner, the initial output includes selectable element(s) that correspond to conversation mode(s) that are tailored to determined attribute(s) of an object in the processed image(s).

In response to selection of one of the selectable elements, further output is caused to be displayed, where the further output includes object data that is tailored to the conversation mode of the selected element, and that is tailored to the object in the processed image(s). For example, the object data can be identified based on content that is responsive to a query formulated based on the conversation mode and based on one or more of the determined attribute(s) of the object (including, and/or in addition to, the determined attributes utilized to select the subgroup of conversation modes). The query can be issued to retrieve the responsive content in response to the selection of the selectable element, or can be issued prior to selection of the selectable element. Further, the object data that is based on the responsive content can be audibly or graphically rendered at the client device, as further output, in response to the selection of the selectable element. For example, the object data can be graphically presented along with a rendered real-time image feed from the camera. In this manner, the further output includes object data that is tailored to a selected conversation mode and to determined attribute(s) of an object in the processed image(s).

In some implementations, one or more contextual features can additionally be utilized in selecting the conversation mode(s), determining a presentation prominence for selectable elements for multiple conversation mode(s), and/or in determining the object data. The contextual features can include, for example, a location of the computing device, a time of day, a day of the week, features of object(s) recently detected in images from the camera, etc. As one example, a "pricing" conversation mode may be selected based on an object identifier of "food item" if a current location of the computing device is at a "grocery store", whereas the "pricing" conversation mode may not be selected (or a corresponding selectable element presented less prominently) if the current location is instead a "home" location for a user of the computing device. As another example, a query that is issued to determine the object data can be further generated based on the contextual features (e.g., include term(s) that are based on the contextual data).

As one particular example of implementations disclosed herein, a camera of a client device can capture an image. The image can capture a large Red Delicious apple, and can be processed to determine attributes of "food", "apple", and "Red Delicious". A "calorie" conversation mode can be selected, from a group of a plurality of available conversation modes, based on the "calorie" conversation mode being defined, in one or more computer readable media, as having an association to the "food" attribute. A selectable element that corresponds to the "calorie" conversation mode can then be displayed, at an interface of the client device, as initial output. In response to selection of the "calorie" selectable element, further output can be displayed that is tailored to the "calorie" conversation mode, and that is further tailored to the "Red Delicious" and "apple" attributes. For example, a query of "calories in Red Delicious apple" can be transmitted to a search engine, a response of "72 Calories" received, and "72 Calories" displayed at the client device. For instance, the object data can be graphically presented along with a rendered real-time image feed from the camera. Further, the user can thereafter direct the camera at different food objects and receive calorie information for those objects. For example, an additional image captured by the camera while still in the "calorie" mode can capture a banana, and can be processed to determine a "banana" attribute. Based on the "banana" attribute being determined in the additional image, a query of "calories in banana" can be transmitted to a search engine, a response of "105 Calories" received, and "105 Calories" displayed at the client device.

In various implementations, the above and other techniques described herein enable a user to interact with an automated assistant and obtain relevant output from the automated assistant without requiring arduous typed input to be provided by the user and/or without requiring the user to provide spoken input that could cause privacy concerns (e.g., if other individuals are nearby). Further, various implementations can reduce the number of inputs required to obtain relevant input relative to other techniques, which may conserve client device computational resources and/or assist users with speech and/or dexterity issues. Additionally, various implementations disclosed herein perform processing of images locally at a client device to determine attribute(s) of object(s) contained in the images. In some of those various implementations, any selection of a conversation mode and/or determining of object data that occurs on a remote device can occur based on the determined attributes, without any reference to the images themselves. In this manner, the images can be maintained at the client device, without requiring the images to be transmitted from the device to select a conversation mode and/or obtain responsive object data—thereby enhancing the security of those images.

In some implementations, a method implemented by one or more processors is set forth. The method can include steps such as generating an object identifier for an object graphically represented in a real-time image feed from a camera of a computing device. The real-time image feed can be displayed at an interface of the computing device and generating the object identifier can include processing one or more images from the real-time image feed. The method can also include selecting, based on the generated object identifier, a conversation mode from a plurality of conversation modes for interacting with an assistant application via the camera of the computing device. Additionally, the method can include causing, in response to the selection of the conversation mode, a selectable element that corresponds to the selected conversation mode to be displayed at the interface of the computing device. The method can further include receiving, at the interface, a selection of the selectable element, causing a query to be transmitted for retrieving data associated with the object identified by the object identifier, and causing, in response to receiving the selection, the data to be displayed at the interface.

In some implementations, the method can include, when the real-time image feed is displayed at the interface, receiving a selection of a graphical representation of the object at the interface. Additionally, the step of generating the object identifier can be in response to receiving the selection of the graphical representation of the object. The data can be displayed simultaneous to the interface displaying the graphical representation of the object. The selectable element can identify the image conversation mode in which the assistant application provides the data. In some implementations, the method can include determining contextual data associated with the image data. In this way, selecting the image conversation mode can be further based on the contextual data. The contextual data can include geolocation data that identifies a location of the computing device. The textual data can include a time at which the real-time image feed is being generated by the camera.

In yet other implementations, a system is set forth as including a camera, a display device, one or more processors in communication with the display device and the camera, and memory. The memory can be configured to store instructions that, when executed by the one or more processors, cause the one or more processors to perform steps that include receiving image data from the camera. The image data can include or capture an object being present in a field of view of the camera. The steps can also include determining, based on processing the image data, an object identifier for the object, and causing a selectable element to be graphically represented at the display device. The selectable element can identify a conversation mode for interacting with an assistant application using the camera. The steps can further include receiving a selection of the selectable element, and transmitting the object identifier and a selection identifier, corresponding to the received selection, to one or more remote devices configured to provide object data based on the object identifier and the selection identifier. The steps can also include receiving the object data from the one or more remote devices, and causing the object data to be graphically represented at the display device simultaneous to the object being present in the field of view of the camera. The object can be associated with different types of object data available at the one or more remote devices, and the conversation mode can be associated with at least one type of object data to be represented at the display device by the assistant application. In some implementations, the steps can include, in response to a different object being presented in the field of view of the camera, causing different object data to be graphically represented at the display device. The different object data can correspond to the at least one type of object data associated with the conversation mode. In some implementations, the steps can include, in response to a different object being presented in the field of view of the camera, causing a different selectable element to be graphically represented at the display device. The different selectable element can identify a different conversation mode in which to interact with the assistant application using the camera.

In yet other implementations, a non-transitory computer readable medium is set forth. The non-transitory computer-readable medium can store instructions that, when executed by one or more processors, cause the one or more processors to perform steps that include operating an assistant application in an image conversation mode in which the assistant application is responsive to a real-time image feed provided by a camera of a computing device. The steps can also include causing the assistant application to provide object data at an interface of the computing device where the image feed is displayed. The object data can correspond to a first object graphically represented in the image feed and a type of data associated with the image conversation mode. The steps can further include receiving, at the interface, a selection of a graphical representation of a second object at which the camera is directed, and causing the assistant application to provide different object data at the interface of the computing device. The different object data can correspond to the type of data associated with the image conversation mode. In some implementations, the steps can include generating contextual data associated with the image feed, and selecting the type of data according to the contextual data. The type of data can include: pecuniary data, nutritional data, and/or factual data. The contextual data can include: geolocation data associated with the computing device, and/or time data associated with the image feed.

In some implementations, the steps can include causing the assistant application to query a third-party agent application for the different object data in response to receiving the selection of the graphical representation of the second object. In other implementations, causing the assistant application to query the third-party agent application can include causing an object identifier, corresponding to the different object, to be transmitted to a remote device that hosts the third-party agent application. The interface can be a touch screen display, and the selection of the graphical representation of the second object can be a touch input at the touch screen display. The steps can also include causing the assistant application to provide a selectable element at the interface of the computing device. The selectable element can identify a different image conversation mode available through the assistant application.

In addition, some implementations include one or more processors of one or more computing devices, where the one or more processors are operable to execute instructions stored in associated memory, and where the instructions are configured to cause performance one or more methods described herein. The processors may include one or more graphics processing units (GPUs), central processing units (CPUs), and/or tensor processing units (TPUs). Some implementations include one or more non-transitory computer readable storage media storing computer instructions executable by one or more processors to perform one or more methods described herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
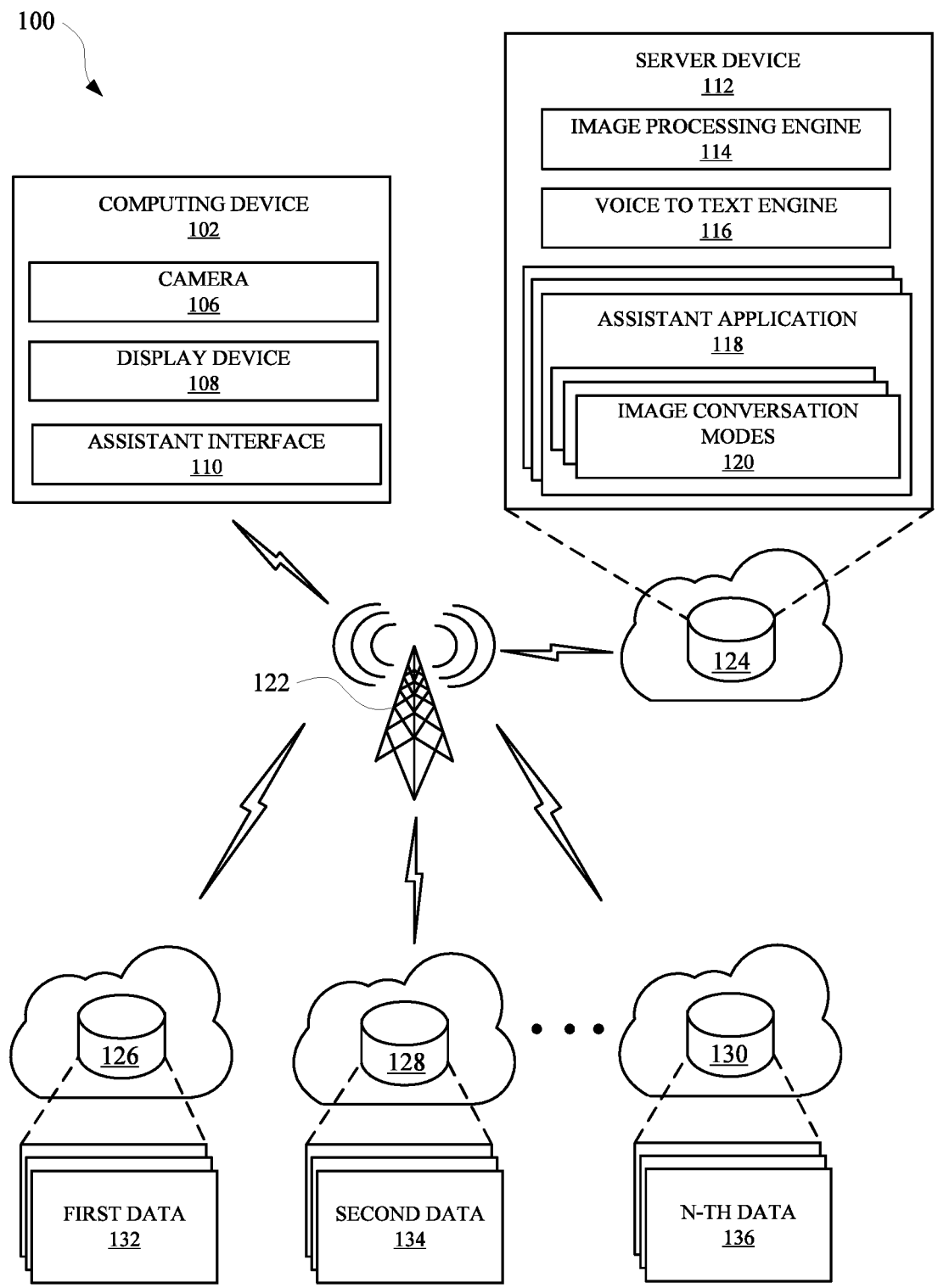
FIG. 1 illustrates a system for providing an automated assistant application that is operable in a variety of image conversation modes.

In various implementations disclosed herein, an automated assistant is provided that can cause particular information to be presented (e.g., audibly and/or graphically) at a client device in response to particular objects being provided in a viewable range of a camera of the client device. In some implementations, the automated assistant can leverage the computational resources of a remote device (e.g., a remote server) to process images from the camera to identify particular objects in the images. In response, the remote device or the automated assistant can suggest functions and/or provide information related to the identified objects. For example, when a certain object is identified in an image, the automated assistant can respond according to a predetermined process established for similar objects (e.g., a process established for any objects that conform to classification(s) of the certain object). For instance, a user can create, through a verbal command or other interface input, a preference for the automated assistant to provide certain information when the camera is directed at an object having one or more particular attributes (e.g., "Assistant, could you please show me competing pricing options for a car when I point the camera at the car" (where the particular attribute is a classification of "car")). Additionally or alternatively, an automated assistant can be preconfigured by a party that created the automated assistant and/or using configurations created by other users. For instance, if one or more users create a preference for their automated assistants to respond in a certain manner to certain objects viewed by their cameras, the preference can be preconfigured in, or otherwise shared with, other automated assistants. The manufacturer, or a third party, can configure the automated assistant to operate according to image conversation modes in which the automated assistant is responsive to particular objects being present in a viewable range of a computing device camera.

The computing device that employs the automated assistant can be a wearable device, a cellular device, a tablet computer, and/or any other device capable of hosting an automated assistant. In some implementations, the computing device can include at least a microphone, a display (e.g., a touch display), and a camera for collecting images to be processed by the remote device. The user can provoke the automated assistant through a camera application, an automated assistant application, and/or any application capable of processing an image captured by the camera. For example, while operating a camera application, the user can point the camera at a food item (e.g., an apple), thereby causing an image of the food item to be graphically presented at the display of the computing device. The image can be processed at the computing device and/or transmitted to a remote device for remote processing, to identify feature(s) of object(s) contained in the image. For example, an object identifier can be transmitted back to the computing device (when the image is processed remotely), or generated at the computing device (when the image is processed locally), and used by the automated assistant to provide suggestions of conversation modes for assisting the user.

As one particular example, an object identifier identified based on processing of an image can indicate that an object in the image is food, and the suggestions can identify conversation modes related to the food. For instance, the touch display can present multiple selectable elements, with each selectable element including corresponding text and/or other indicia that identifies a conversation mode (e.g., calorie mode, nutrition mode, price mode, etc.) that is selected based on the "food" object identifier. In response to the user selecting one of the conversation modes that are relevant to the object identifier, the automated assistant can cause content to be provided that is based on the selected conversation mode. For example, if the user selects the calorie mode, the automated assistant can cause calorie information to be presented at the display and/or rendered audibly. For instance, the automated assistant can cause "There are 95 calories in an apple" to be displayed and/or audibly presented, where the calorie information is provided based on the selected "calorie mode", and is tailored to caloric content of an "apple" based on an additional object identifier for the object that indicates the object is an "apple". The additional object identifier can also be generated, locally or remotely, through processing of the image and/or an additional image. The calorie information can be rendered by the computing device simultaneous to a real-time image feed from the camera also being displayed at the computing device. In these and other manners, the user can direct the camera at different food items in order to cause the automated assistant to present calorie information about different foods, without having to verbally query the automated assistant. For example, while the calorie mode is selected, the user can point the camera at an apple to cause calorie information about the apple to be presented, and then re-direct the camera at a banana to cause calorie information about the banana to be presented. For instance, the calorie information about the banana can be presented based on the selected "calorie mode", and can be tailored to caloric content of a "banana" based on an additional image being captured while the camera is directed at the banana, and an object identifier of "banana" being generated based on the additional image.

In some implementations, conversation modes corresponding to different objects in a field of view of the camera can be presented. In other words, the user can be presented with suggestion elements associated with the different objects, despite the objects being categorically different. For instance, the user can point the camera of their computing device toward a street that includes restaurants, parked cars, and a skyline. An image that includes the aforementioned objects can be processed by the computing device, or a remote device, for providing object identifier(s) for each of the objects. In some implementations, the automated assistant can query the user to identify the object they are interested in (e.g., "Tap on what you're interested in."). In response, the user can tap the touch display at an area where an object is graphically represented, or otherwise indicate to the automated assistant that they are interested in a particular object (e.g., the restaurants).

A location where the user tapped can be mapped to object identifier(s) of an object at the location, and, in response, the automated assistant can cause suggestion elements to be presented at the touch display for initializing a conversation mode associated with the object identifier(s) of the selected location. For instance, if the selected location is mapped to a "restaurant" object identifier, the suggestion elements presented to the user at the touch display can correspond to a restaurant review mode, a social event mode, a fun facts mode, and/or any other mode that is associated with a "restaurant" object identifier. When the user selects the restaurant review mode, the automated assistant can cause restaurant review(s) to be presented at the touch display according to which restaurant the user is directing their camera. For example, a particular restaurant currently captured in an image can be identified based on processing of the image (e.g., based on recognition of text, in the image, that includes the restaurant's name and/or logo) and/or based on other contextual cues (e.g., based on a current location of the computing device). Further, one or more reviews related to the particular restaurant can be gleaned from various sources (e.g., restaurant review websites and applications), and snippet(s) of the review(s) provided for display at the touch display simultaneous to the camera being directed at the restaurant with which the reviews are associated.

In some implementations, the conversation modes available to the user can include a random fact mode, a price comparison mode, a review mode, a nutrition mode, a specifications mode, and/or any other mode where details of an object in an image can be presented. For instance, when the user selects the random fact mode, the user can direct the camera of their computing device toward an object to cause the automated assistant to present a random fact about the object. In some implementations, the random fact can be generated by the automated assistant using a web query that is initialized by the automated assistant as a background process relative to a camera application that is controlling the camera. The background process can include determining object identifier(s) for an object in the image, generating a query based on the object identifier(s) and optionally based on the selected conversation mode, and identifying a random fact about the object based on search result(s) that are responsive to the query. The random fact can then be presented at an interface with the camera application. In some implementations, the results include web search results and the random fact is generated based on one of the web search results (e.g., a snippet from one of the web search results). In some implementations, the query is issued against a knowledge graph or other database that defines a plurality of entities and, for each of the entities, properties of the entity and/or relationship(s) of the entities to other entities. For example, the query can define a particular entity determined through processing of the image, a node of the knowledge graph identified that corresponds to the particular entity, and a random fact generated based on a "result" that is a property assigned to the entity in the knowledge graph. For instance, if the particular entity is a particular restaurant, the random fact can be a "first opened date" for the restaurant, as defined by a "first opened date" property node that is mapped (e.g., via an "edge") to a node, for the particular restaurant, in the knowledge graph.

When the user selects a price mode, the user can direct the camera of their computing device toward an object to cause the automated assistant to present one or more prices for the object. For instance, the automated assistant can transmit an image that includes the object to a remote device for processing and identifying the object. An identifier for the object can be generated at the remote device and transmitted back to the computing device, and the automated assistant can use the object identifier to perform a price query to identify prices for the object. Alternatively, the automated assistant can transmit the image with a price query to cause the remote device to generate an identifier for the object, to use the identifier to identify prices for the object, and to transmit the prices back to the computing device. The automated assistant can use the prices resulting from the price query for presentation at an interface of the camera application. For instance, while the user is directing the camera at the object (e.g., a car), multiple prices for the object can be presented adjacent to the graphical representation of the object. Furthermore, the user can shift the camera to other objects in order to cause the automated assistant to provide, in real-time, prices for the other objects that are in the viewable range of the camera.

In some implementations, a context of the camera usage can additionally or alternatively be used as a basis for the conversation mode. The context can be a location of the user (e.g., as indicated by a location of the user's computing device), a time of the camera usage, data related to persons near the user, other actions being performed by the user, and/or any other context in which a user could be interacting with an automated assistant. In some implementations, a location of the user can be used to select the conversation mode(s) suggested to the user when the user is directing their camera at an object. For instance, when the user is at a restaurant and has received their meal, the user can direct the camera of their computing device at their meal. In response, the automated assistant can use an image of the meal to identify object(s) in the image (e.g., the food items in their meal) and use the object(s) and a location of the user to select conversation modes to suggest to the user. The automated assistant can, for example, filter out or otherwise not select a price mode because the user is at a restaurant and has already received food, therefore the user would likely not be interested in seeing the price of their food. However, the user may be interested in the nutrition mode and/or the calorie mode, in order to appreciate the meal and, perhaps, track their caloric consumption. The resulting selected conversation modes can be suggested to the user while the user is directing their camera at their meal. Should the user select the nutrition mode, the automated assistant can direct the user to tap on an object in their meal (e.g., "Please tap on a food item you are interested in seeing nutrition for?"). For instance, the user can tap on a graphical representation of a baked potato that is on their plate and, in response, the automated assistant can provide nutritional information about the baked potato (e.g., "Iron 6%, Zinc 20%, . . . "). In some implementations, the automated assistant can determine a size of the portion (e.g., a small baked potato, a medium baked potato, a large baked potato, etc.) and provide the nutritional information and/or calorie information according to the size of the portion.

In additional or alternative implementations, a context in which the user is operating the camera can be used by the automated assistant to determine or filter the sources of information for a conversation mode. For instance, a user that is traveling internationally can direct their camera at landmarks of interest in order to cause the automated assistant to provide interesting facts while operating in a fact conversation mode of the automated assistant. The automated assistant can determine that the user is away from their home on vacation (e.g., using geolocation data and/or calendar data), and select the vacation location as the context of the fact conversation mode. As a result, facts presented to the user when the user is directing their camera at an object can be from a source associated with the vacation location. For instance, a user that is traveling to a national park for vacation can direct their camera at a landmark within the national park. The landmark can be, for example, a very large mountain within the national park. Instead of merely collecting facts about mountains from a variety of unfiltered sources, the automated assistant can use the context of the image (e.g., the user being on vacation at a national park) to identify more contextually relevant sources of facts about the mountain. For example, a user directing their camera at Mount Rainer, while on vacation in Mount Rainer National Park, can receive information on activities to do near Mount Rainer (e.g., "Wonderland Trail is a 93 mile trail that circumnavigates the peak of Mount Rainer."), as opposed to receiving non-activity related information (e.g., "Mount Rainer has an elevation of 14,411 feet."). In this way, the user can be within the park and direct their camera at various landmarks in the park to discover activities to do in the park, instead of having to provide specific verbal or textual gestures to discover such activities.

Turning now to the figures, FIG. 1 illustrates a system 100 for providing an automated assistant application that is operable in a variety of image conversation modes. The system 100 can include a computing device 102, which can be a cellular device, a tablet device, a wearable device, a personal computer, and/or any other device capable of employing a camera to capture an image. The computing device 102 can include a camera 106, which can capture photos and/or video for processing by the computing device 102 or a remote device 112. The computing device 102 can further include a display device 108, which can provide a real-time image feed based on image data provided by the camera 106. In some implementations, the display device 108 is a touch display, in that it is touch-sensitive and provides a touch interface for a user to interact with various applications on the computing device 102.

In some implementations, the computing device 102 can include an assistant interface 110, which can be an application interface associated with an assistant application 118 on the computing device 102 and/or the server device 112. In various implementations, all or aspects of the assistant application 118 can be implemented on the computing device 102. In some of those implementations, aspects of the assistant application 118 are implemented via a local assistant application of the computing device 102 and interface with the server device 112 that implements other aspects of the assistant. The server device 112 can optionally serve a plurality of users and their associated assistant applications via multiple threads. In implementations where all or aspects of the assistant application 118 are implemented vi a local assistant application of the computing device 102, the local assistant application can be an application that is separate from an operating system of the computing device 102 (e.g., installed "on top" of the operating system)—or can alternatively be implemented directly by the operating system of the computing device 102 (e.g., considered an application of, but integral with, the operating system).

The assistant application 118 is an automated assistant application capable of receiving verbal and/or textual commands via the assistant interface 110. In response to receiving the commands, the assistant application 118 can provide data, perform an application function, communicate with a third party agent, control a peripheral device, and/or otherwise perform any command suitable for execution by a computing device. For instance, the assistant interface 110 can be a microphone for receiving verbal commands, which can be converted to audio data and processed to determine the appropriate response. The audio data can be processed at the computing device 102 or the server device 112. For example, the server device 112 can include a voice to text engine 116 for processing audio data received from the computing device 102. The voice to text engine 116 can operate to receive the audio data, identify speech within the audio data, and output the speech in textual form so that other applications, such as the assistant application 118, can use the speech text.

The assistant application 118 can operate according to one or more image conversation modes 120. An image conversation mode 120 corresponds to an operating mode in which the assistant application 118 is responsive to image data from the camera 106 of the computing device 102. Furthermore, while operating in an image conversation mode 120, the assistant application 118 can cause dynamic changes to the assistant interface 110 (e.g., a graphical user interface provided at the display device 108), allowing a user to interact with the assistant application 118 while image data is being provided by camera 106. For instance, while operating a camera application at the computing device 102, the assistant interface 110 can be displayed with a real-time image feed from the camera 106. The assistant interface 110 can include one or more selectable elements with text and/or other indicia that invites the user to initialize an image conversation mode (e.g., "Nutrition Mode," "Price Mode," "Fact Mode," "What are you interested in?," etc.). When the user selects a selectable element, data that is relevant to the image conversation mode of the selectable element, and that is relevant to an object in the image, can be graphically and/or audibly rendered via the assistant interface 110 for presentation to a user of the computing device 102. As described herein, the selectable element(s) presented to a user can be selected based on object identifier(s) of an object captured in image(s) captured by the camera 106 and the rendered data can be determined based on object identifier(s) of the object (the same object identifier(s) used in selecting the selectable element(s) and/or additional object identifier(s)). The object identifier(s) of an image can be identified based on processing of the image by the image processing engine 114, which can be provided at the computing device 102 or the server device 112.

The image processing engine 114 can receive the image from the camera 106 and process the image to identify object identifier(s), of object(s) within the image, which can be associated with an image conversation mode 120. The image processing engine 114 can employ one or more image processing techniques for determining object identifiers that correspond to objects in the image captured by the camera 106. For instance, the image processing engine 114 can employ a computer vision algorithm to identify a tangible object that is graphically represented in the image and generate an object identifier that corresponds to the tangible object. Also, for example, the image processing engine 114 can utilize one or more machine learning models, such as a deep neural network model that accepts an image as input, and that utilizes learned parameters to generate, as output based on the image, measure(s) that indicate which of a plurality of corresponding attributes are present in an image. If a measure indicates that a particular attribute is present in an image (e.g., if the measure satisfies a threshold), that attribute can be considered "resolved" for the image (i.e., that attribute can be considered to be present in the image). An object identifier can correspond to one or more of the resolved attributes. For example, a resolved attribute can be a "car" classification, and the object identifier can be the "car" classification. The image processing engine 114 can employ additional and/or alternative image processing techniques in generating object identifier(s), such as optical character recognition ("OCR"), image similarity techniques (e.g., to identify an object identifier based on a "label" for a reference image determined to be most similar to an image under consideration), etc.

One or more object identifiers can be generated by the image processing engine 114 and provided to the assistant application 118. The assistant application 118 can use the object identifiers to provide suggestions regarding the image conversation modes 120 that will be suggested to the user via the display device 108. For example, the assistant application 118 can store or access an index or table that correlates object identifiers to image conversation modes 120 (e.g., nutrition mode, price mode, fact mode, etc.) available to the assistant application 118. For instance, objects that are typically for sale, such as cars and food, can, for example, be correlated to a price mode. Also, for instance, food can additionally be correlated to a nutrition mode, whereas cars would not be correlated to the nutrition mode.

In some implementations, the display device 108 can be a touch display capable of receiving touch inputs for selecting objects that appear in the real-time image feed provided by the camera 106. A user can select objects presented in the real-time image feed in order to identify items of interest. If an object selected corresponds to an object identifier generated by the image processing engine 114 or the assistant application 118, the assistant application 118 can, in response, provide corresponding selectable elements. The corresponding selectable elements can identify image conversation modes 120 in which the user can interact with the assistant application using the camera 106 and the display device 108.

In other implementations, when the user is operating a camera application, or any other application (e.g., the assistant application) that employs the camera 106, the assistant application 118 can present selectable elements for activating an image conversation mode 120. For instance, a user can be walking down a street and direct their camera 106 at buildings that are facing the street. The assistant application 118 can simultaneously present options for activating particular image conversation modes 120, such as a price mode, a translate mode, a facts mode, a review mode, and/or any other mode that can be associated with images captured by the camera 106. If the user selects a mode (e.g., a price mode), additional modes and/or data can be presented at the display device 108, in place of any previously represented modes. For instance, if the user selects the price mode, prices of objects in the street can be presented at the display device. The objects can be identified using the image processing engine 114 and their prices can be identified through a separate first network device 126, which can communicate with the server device 112 over a network 122, such as the internet. While in the price mode, the user can direct the camera 106 in different directions to cause the prices of different objects to be displayed. Furthermore, as a result of the user directing the camera 106 at different objects, selectable elements for other modes relevant to those object(s) can be displayed.

In yet other implementations, the user can be operating the camera 106 and directing the camera 106 at a document or other textual medium that includes a language that is not the primary dialect of the user. An image captured from the camera 106 can be processed for identifying one or more languages of text that are in the captured image. The text can then be translated by a translator application that is available to the assistant application 118, and the translated text can be presented by the assistant application 118 at the display device 108 of the computing device 102. In some implementations, the translation application can provide an indication of the language of the text for comparing with a primary dialect setting of the assistant application 118. If the language indicated is the same as the primary dialect setting, the assistant application 118 can bypass providing any translated text at the display device 108. However, if the language indicated is different than the primary dialect setting, the assistant application 118 can provide the translated text at the display device 108.

In some implementations, a prompt can be provided to the user by the automated assistant 118 regarding whether to enter the translate mode. However, in other implementations the assistant application 118 can bypass prompting the user regarding whether to present the translated text and automatically provide the translated text at the display device 108 when the user directs the camera 106 at a particular object. For instance, the assistant application 118 can present updated translated text in response to the user redirecting the camera 106 at an object that includes foreign text. In some implementations, other conversation modes related to the translated text can be presented to the user at the display device 108 by the automated assistant 118. For example, if the user is directing the camera 106 at a menu that is provided in a foreign language (e.g., German), the automated assistant 118 can cause the display device 108 to present translated text from the menu. Furthermore, the automated assistant 118 can process the translated text to determine a context of the text and/or other properties of the text. For instance, the automated assistant 118 can determine that the translated text relates to food and provide a selectable element related to entering a calorie mode. Alternatively, if the user has previously selected the calorie mode when directing their camera 106 at other foods, the translated text (e.g., "baked potato and steak") can be presented at the display device 108 along with calorie or nutrition data (e.g., "800 calories") for the food identified by the translated text.

In some implementations, while operating in a particular mode (e.g., a nutrition mode), data related to the particular mode can be presented about objects in the viewing area of the camera 106. When the user directs the camera 106 at an object that was not previously in the viewing area, other modes and/or data can be presented. For instance, when the user is operating the assistant application 118 in the nutrition mode, in which nutritional data is presented for food represented in the real-time image feed, the user can direct the camera 106 at a type of food they typically get at the grocery. In response, the assistant application 118 can suggest another mode for continuing an image conversation with the assistant application 118. The other mode can be, for example, a price mode, in which prices from competing vendors of the food are displayed at the display device 108. The other mode can be identified in a selectable element that is presented at the display device 108 simultaneous to the grocery item being presented at the display device 108. In this way, the user is able to intuitively transition between modes while still operating their camera 106. In other implementations, the assistant application 118 can determine over time that the user prefers to enter the nutrition mode when directing the camera 106 at food. As a result, the assistant application 118 can bypass presenting the user with a selectable element for entering the nutrition mode and, instead, automatically provide nutrition data about the food the camera 106 is directed at. In this way, the user does not need to continually make a manual selection for entering an image conversation mode, but rather, can rely on the assistant application 118 learning the image data the user prefers to view under certain circumstances.

In some implementations, the assistant application 118 can access data for the image conversation modes through the network 122. For instance, the assistant application 118 can be connected to one or more remote devices (e.g., a first remote device 126 that includes first data 132, a second remote device 128 that includes second data 134, and an Nth remote device 130 that includes Nth data 136). Each of the remote devices can include data associated with object identifiers generated by the image processing engine 114 and/or the assistant application 118. For instance, when the assistant application 118 is being accessed at the computing device 102 and the assistant application 118 is operating in the price image conversation mode, the assistant application 118 can access one or more of the remote devices (e.g., 126, 128, 130) to retrieve price data. The price data can be associated with competing prices for an object at which the camera 106 is directed. In some implementations, the remote devices can host websites, application data, and/or any other data that can be accessed over a network and associated with an object.

The suggestion of a particular image conversation mode can be based on one or more machine learning models that can receive one or more inputs and output probabilities for image conversation modes to be suggested. For instance, the assistant application 118 can include or access a machine learning model that can receive an image from the camera 106 and process the image 106 to determine suitable image conversation modes to suggest. The machine learning model can be a deep neural network model, which can be trained to enable generation of probabilities based on input that includes an image of an object and/or object identifier(s) generated based on an image. The probabilities can be correlated to image conversation modes in which the assistant application 118 can operate. For instance, when an image that includes an automobile is applied to the machine learning model, the machine learning model can be utilized to generate a higher probability for a price image conversation mode than a probability for a nutrition image conversation mode. Furthermore, when an image that includes multiple food items is applied to the machine learning model, the machine learning model can be utilized to generate a higher probability for a nutrition image conversation mode than a fact image conversation mode.

In yet other implementations, the assistant application 118 can include or access multiple machine learning models that can accept different inputs. For instance, the assistant application 118 can access a first machine learning model that receives an image as an input and a second machine learning model that receives image context as an input. The image context can be input to the second machine learning model using one or more context identifiers. A context identifier can include data that identifies a context of an image, such as a location, a time, an event, an environment, and/or any other feature that can be indicative of context. For instance, the context identifier can identify a location of where an image was captured using geolocation data provided by a global positioning system (GPS) transmitter of the computing device 102. The geolocation data can be used by the assistant application 118 to identify the location of where the image was captured. For example, the assistant application 118 can access a map application over the network 122 to determine that a user is positioned inside of a particular restaurant. The restaurant name or the location can be provided to the second machine learning model, and the second machine learning model can output a higher probability for a review image conversation mode than fact image conversation mode. Furthermore, an image of food from the restaurant can be provided to the first machine learning model and, in response, the first machine learning model can provide equal probabilities for the review image conversation mode and the fact image conversation mode. However, because the second machine learning model has provided a higher probability for the review image conversation mode, the review image conversation mode can be suggested to the user at the display device 108.

In some implementations, the computing device 102 can include one or more memory devices capable of storing images, documents, and/or any other media capable of being stored and/or edited by a computing device. Furthermore, when a user is accessing a memory device of the computing device 102, the assistant application 118 can be responsive to the media being accessed by the user. For instance, the user can be viewing an image of food and the assistant application 118 can process the image to determine suggestions for image conversation modes 120 to present to the user for selection. In some implementations, the assistant application 118 can suggest a nutrition image conversation mode and a calorie image conversation mode when the user is viewing images that are stored at the computing device 102 or otherwise being accessed at the computing device 102. Alternatively, the user can be viewing a document in a portable document format (PDF) and the assistant application 118 can process the PDF in order to identify content of the PDF that is associated with an available image conversation mode. For example, if the PDF is a scientific journal article, the assistant application 118 can present the user with a selectable element for entering a fact image conversation mode, which can provide facts for assisting the user with understanding the journal article. Alternatively, the assistant application 118 can automatically enter the fact image conversation mode and present facts at the display device 108. For instance, the facts can be based on content provided in the PDF and the presented facts can change dynamically as the user is scrolling through the PDF or opening different PDFs.

Figure 2A:
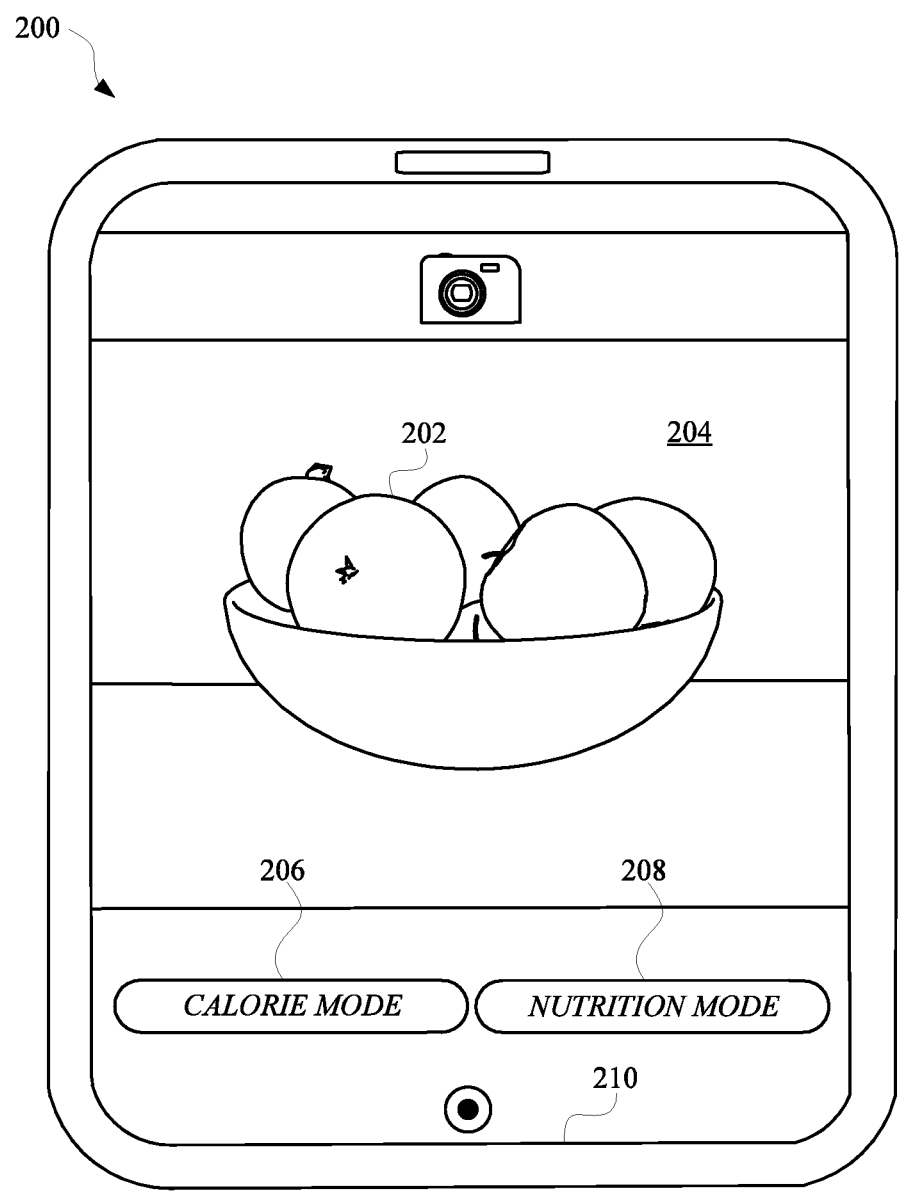
FIG. 2A illustrates a view of a computing device that includes or accesses an automated assistant application capable of operating in multiple different image conversation modes.

FIG. 2A illustrates a view 200 of a computing device 210 that includes or accesses an automated assistant application capable of operating in multiple different image conversation modes. An image conversation mode is an operating mode in which the automated assistant provides data in response to a camera of the computing device 210 being directed at one or more objects. For instance, the image conversation modes can include a calorie mode and a nutrition mode. While operating in the calorie mode, a user of the computing device 210 can direct a camera (e.g., a camera located on a back surface of the computing device 210, facing away from an interface 204) at an object, such as an apple 202, and receive calorie data for the apple 202. For example, the calorie data (e.g., "An apple has 95 calories") can be presented at the interface 204 of the computing device 210 simultaneous to the camera providing the image of the apple 202 in a real-time image feed. While operating in the nutrition mode, the user of the computing device 210 can direct the camera at an object, such as the apple 202, and receive nutrition data for the apple 202. The nutrition data (e.g., "Potassium 195 mg, dietary fiber 4.4 g, . . . ") can also be presented at the interface 204 simultaneous to the camera providing the image of the apple 202 in the real-time image feed.

FIG. 2A can illustrate the interface 204 a user sees when operating a camera of the computing device 210 to initialize an image conversation mode (e.g., a calorie mode and/or a nutrition mode 208). While operating a camera application, which can provide a real-time image feed of what the camera is directed at, images from the real-time image feed can be processed to identify objects within the images. For instance, an image can be transmitted from the computing device 210 to a remote device (e.g., a server device) for processing, or the image can be processed at the computing device 210. Processing the image can include executing a computer vision algorithm for identifying and classifying objects within the image. When each object has been identified, one or more object identifiers or classifications can be generated or identified, and used by the assistant application to recommend image conversation modes. For example, when the camera is directed at the apple 202, the assistant application can determine that the camera is directed at an apple 202 or food and identify suitable image conversation modes to suggest to the user. The image conversation modes can be correlated to various object identifiers, object types, object classifications, and/or any other descriptor for an object. Correlations for the objects and the conversation modes can be provided by an index accessible to the automated assistant, or inferred from one or more machine learning models, as discussed herein.

The image conversation modes identified by the automated assistant can be selectable at the interface 204 as a first selectable element 206 and a second selectable element 208. Specifically, the first selectable element 206 can identify a first image conversation mode (e.g., "CALORIE MODE") and the second selectable element 208 can identify a second image conversation mode (e.g., "NUTRITION MODE"). When the user selects either of the selectable elements, the automated assistant can receive the selection and generate a query for providing data corresponding to the image conversation mode. Alternatively, the assistant application can access the data when the data is available at the computing device 210. The query can be generated based on the object identifier for the object (e.g., the apple 202) in the image, and the image conversation mode selected by the user (e.g., the calorie mode). As one example, a query template of "calories in [most granular classification for object]" can be defined for a "calorie" conversation mode. The placeholder "[most granular classification for object]" can be filled in with an alias for the most granular classification for the object in the image. For instance, assume an image includes a large Red Delicious apple. If the most granular classification determined based on processing of the image is "apple", the query can be "calories in apple". On the other hand, if the most granular classification determined was "Red Delicious apple", the query can be "calories in Red Delicious apple"—or if the most granular classification determined was "large Red Delicious apple", the query can be "calories in large Red Delicious Apple". As yet another example, a non-natural language query can be generated based on the selected conversation mode and an identifier of an object. For instance, for a "calorie" conversation mode, a query template of "[calorie parameter] for [node for most granular classification for object]" can be defined. The query template defines that the data responsive to the query is a calorie parameter defined, in an entity database, for a node of the entity database that corresponds to the most granular classification of the object.

The query can be transmitted to a remote device that hosts the assistant application, a search engine, a knowledge graph system, and/or other system(s) that are responsive to queries. The remote device can use the query, that is based on the object identifier (e.g., "apple") and the image conversation mode selected, to provide the assistant application with data (e.g., calorie content of the apple) for presenting at the interface 204. For example, a search engine can provide an "authoritative answer" (if any) to the query as the data, or a most pertinent snippet from the most highly ranked document responsive to the query as the data. Also, for example, a knowledge graph system can identify particular node(s) of a knowledge graph based on the query, and provide information from the node(s) (or corresponding to the nodes) as the data. The remote device can store the data or access the data from a separate server that includes application data or web data satisfying the query. When the assistant application receives the data, the data can be presented at the interface 204 while the camera is directed at the apple 202.

In some implementations, when the user selects a selectable element (e.g., the first selectable element 206) corresponding to an image conversation mode, the data (e.g., calorie content) can be presented along with other suggestions for image conversation modes. For instance, when the user selects the calorie mode, a query can be transmitted to a remote device for identifying the data that will satisfy the query. The remote device, which can host the assistant application, can also identify other conversation modes that might be useful to a user that is interested in the calorie content of food. For example, the assistant application can include a health tracker image conversation mode that allows the user to direct the camera at different foods in order to see how they fit in the diet or daily caloric intake for the user. When operating in the health tracker image conversation mode, the automated assistant can compare the nutritional value or caloric content of food the user previously ate to the food that the camera is being directed to. The automated assistant can cause the interface 204 to present the user with notifications when a particular food item is outside of the diet, or cause their desired daily caloric intake to be surpassed for the day. The health tracker image conversation mode can be represented as an additional selectable element in response to the user selecting the calorie mode or nutrition mode.

Figure 2B:
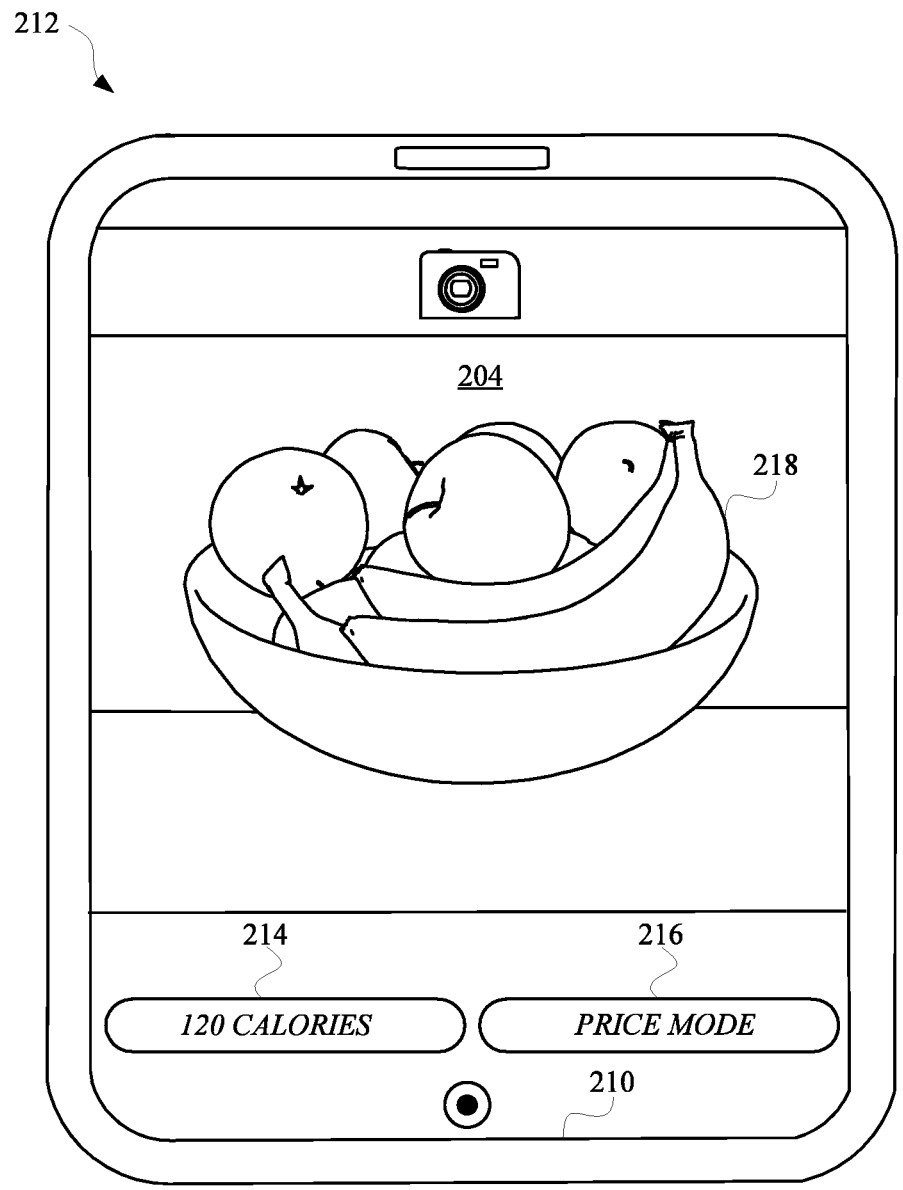
FIG. 2B illustrates a view of the computing device operating in an image conversation mode.

FIG. 2B illustrates a view 212 of the computing device 210 operating in an image conversation mode. Specifically, FIG. 2B illustrates an automated assistant application causing the interface 204 to provide calorie data 214 at the interface while the camera is directed at a different object 218 (a banana). The automated assistant can also cause the interface 204 to provide additional suggestions for image conversation modes while operating an image conversation mode. For instance, the user can select the calorie mode from FIG. 2A and redirect the camera from object 202 of FIG. 2A to object 218 of FIG. 2B. The real-time image feed provided at the interface 204 can update with the object 218 and an image from the real-time image feed can be processed to identify objects in the image. The image can be processed and an object identifier can be generated from the image. The object identifier can then be used by the automated assistant to generate a query for identifying caloric data associated with the object 218. The caloric data (e.g., "120 CALORIES") can then be presented at the interface 204 as a graphical element 214 while the camera is directed at the object 218.

In some implementations, the automated assistant can cause the interface 204 to present other suggestions for image conversation modes in response to the camera being redirected from one object (e.g., object 202) to another object (e.g., object 218). For instance, a machine learning model can determine probabilities for the image conversation modes to be suggested to the user. The image conversation modes can be ranked according to their corresponding probabilities and the top N (e.g., 1, 2, 3, etc.) image conversation modes can be suggested to the user while the user is directing the camera at an object. After the user selects one of the conversation modes, one or more other conversation modes that were not previously presented can be presented to the user as an additional selectable element 216. For example, a price image conversation mode can be presented to the user in response to the user previously selecting a different image conversation mode (e.g., the calorie image conversation mode) and redirecting the camera to a different object (e.g., object 218). If the user selects the price image conversation mode (e.g., by selecting the additional selectable element 216), a price for the object 218 can be presented at the interface 204 with, or in place of, the graphical element 214 (that displays the data responsive to the calorie mode).

Figure 3A:
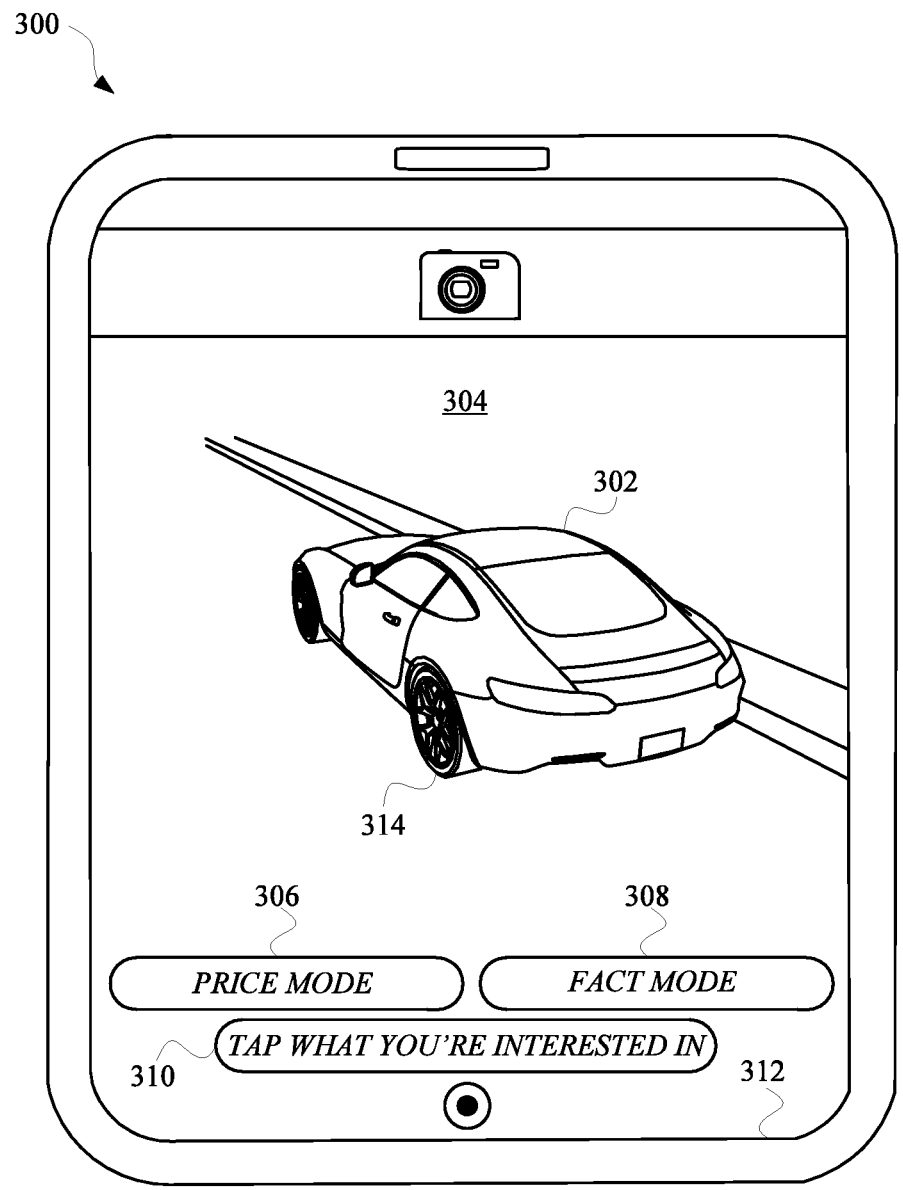
FIG. 3A illustrates a view of a computing device operating an automated assistant application capable of using context data and image data to provide data and/or execute certain controls.

FIG. 3A illustrates a view 300 of a computing device 312 operating an automated assistant application capable of using context data and image data to provide data and/or execute certain controls. Specifically, the automated assistant can provide suggestions regarding image conversation modes to operate in according to the context data and the image data. For instance, a user can be operating a camera application of the computing device 312 and directing a camera of the computing device 312 at an object 302 (e.g., a car). An image provided by the camera can be processed by the automated assistant or a separate application for identifying one or more objects in the image. The automated assistant can receive or generate an object identifier (e.g., a data object that identifies the car), which can be used by the automated assistant to select one or more image conversation modes to present at the interface 304. Furthermore, the automated assistant can receive or generate a context identifier (e.g., a data object that identifies a context of the image), which can be used by the automated assistant to further narrow the selection of the image conversation modes to present at the interface 304.

In some implementations, a user can be walking through a car lot shopping for a car and using the camera of the computing device 312 to capture images of the cars in the car lot. The automated assistant can receive an image of a car, such as the image presented at the interface 304 of FIG. 3A, and use the image to determine that the camera is directed at the car. The automated assistant can determine image conversation modes to suggest to the user according to the objects identified in the image. For instance, because the image includes a car (i.e., object 302), the automated assistant can identify image conversation modes associated with cars, such as, for example, a price mode, a fact mode, and/or a directions mode. Furthermore, the automated assistant can determine a context of the image to select the image conversation modes to suggest to the user. The context can be based on a time at which the image was captured, a location at which the image was captured, an event associated with the image, and/or any other contextual descriptor that can be embodied in data. For instance, the location at which the image was captured can be a car lot for buying cars, thereby indicating the user would be interested in learning about the car rather than receiving directions for going somewhere with the car. Therefore, the object identifier (e.g., "car") and a context identifier (e.g., "a car lot") can be used in combination by the automated assistant to select the image conversation modes to be suggested to the user. For example, the price mode and the fact mode can be suggested to the user, while the directions mode can be omitted from the suggestions. For instance, an index or table may define the price mode and the fact mode as being more relevant to the combination of an object identifier of "car" and a context identifier of "car lot", than is a "directions mode" to the combination. The suggestions can be identified in a first selectable element 306 and a second selectable element 308 at the interface 304, as provided in FIG. 3A.

In some implementations, each of the object identifier and the context identifier can be input into one or more machine learning models (e.g., a deep learning model) for correlating probabilities to each of the image conversation modes available to the automated assistant. For instance, the object identifier for object 302 can be provided to a first learning model for determining the probabilities or ranks for image conversation modes to suggest to the user. The context identifier that identifies the context of the object can be provided to a second machine learning model for determining the probabilities or ranks for image conversation modes to suggest to the user. Probabilities from the first learning model and the second learning model can be combined according to their respective image conversation modes, and the image conversation modes corresponding to the highest probabilities can be presented to the user. According to the aforementioned example, the price mode and the fact mode can be associated with higher probabilities than a directions mode when the object identifier is a car and the context identifier is a car lot.

In other implementations, the assistant application can provide a graphical element 310 that advises the user to tap on different objects, or different portions of an object, presented at the interface in order receive data or suggestions of image conversation modes associated with the selected objects. An image provided by the camera can be processed by the assistant application or separate application to identify the parts of the image that correspond to objects. Each of the objects can be correlated to object identifiers such that, when the user taps on a portion of the interface, the object identifier can be processed to provide suggestions for image conversation modes. For instance, the automated assistant can generate object identifiers for the car and a tire 314 from the image at the interface 304. If the user taps on the tire 314, the suggestions for image conversation modes can be different than if the user tapped on the body of the car. The automated assistant can generate different object identifiers from an image using one or more techniques that can classify an image on a pixel-by-pixel basis, or a pixel group-by-pixel group basis. For example, each N×N group of pixels of the image can be associated with one or more corresponding object identifiers (and optionally corresponding probabilities for each of multiple object identifiers). For instance, a group of pixels that correspond to the tires of the car can be associated most strongly with a "tire" object classification, whereas groups of pixels that correspond to other portions of the car are associated most strongly with a "car" classification. If the user selects one or more of the "tire" pixels (e.g., through a "tap" or "encircling" or otherwise bounding those pixels through touch, image conversation mode(s) most relevant to a "tire" classification can be presented. If, on the other hand, the user selects one or more of the "car" pixels, image conversation mode(s) most relevant to a "car" classification can be presented.

Figure 3B:
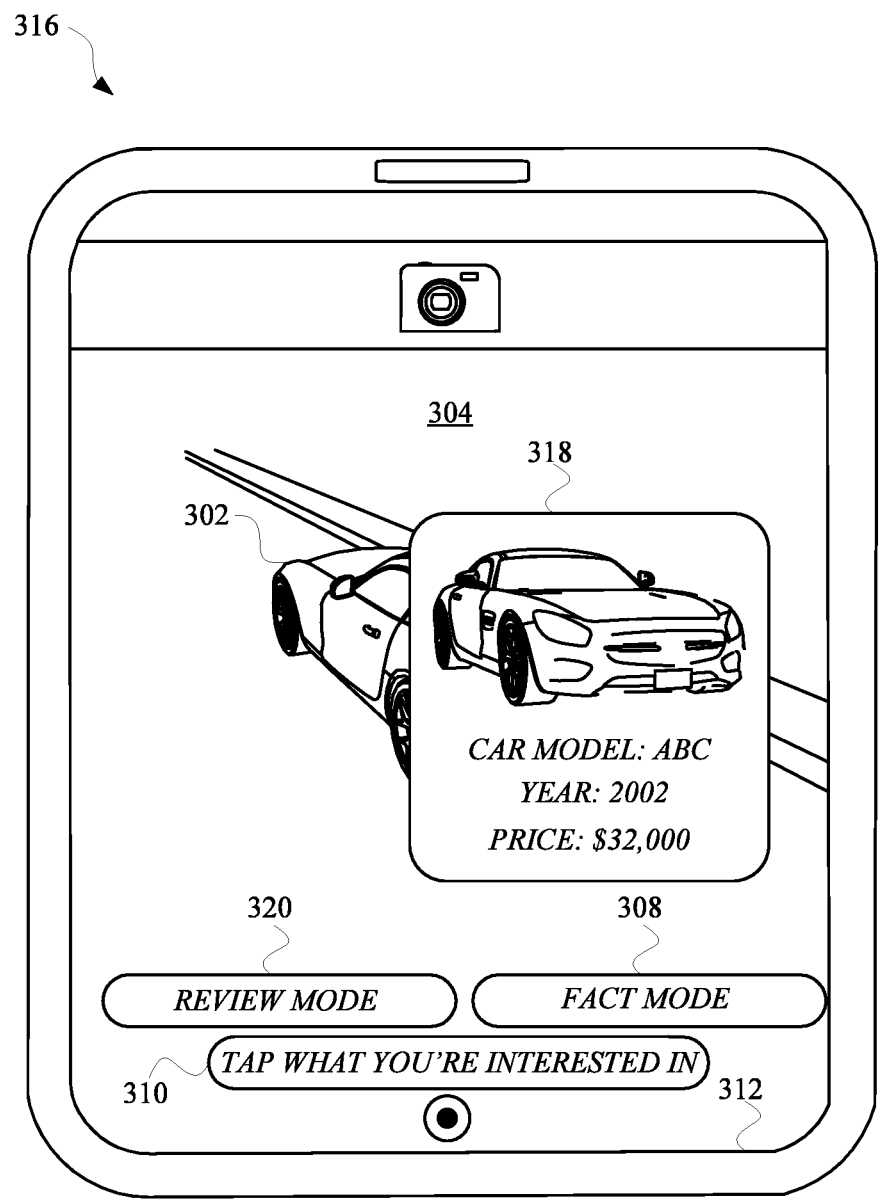
FIG. 3B illustrates a view of a computing device operating an automated assistant in a pricing image conversation mode in which the pricings of objects is presented at the interface when the user directs the camera at the objects.

FIG. 3B illustrates a view 316 of a computing device 312 operating an automated assistant in a price image conversation mode in which prices of objects are presented at the interface 304 when the user directs the camera at the objects. Specifically, a user can select the price mode (e.g., selectable element 306) presented in FIG. 3A to cause a conversation element 318 to be presented at the interface 304. The conversation element 318 can include data related to the object selected by the user (e.g., the car). For instance, because the user selected the car, the automated assistant can cause a query to be generated for identifying a price of the car, as well as any other data that can assist the user in reflecting on the price of the car (e.g., the model and the year).

In response to the user selecting the price mode, the suggestions for image conversation modes at the interface 304 can be modified. For instance, a selectable element 320 can be presented in place of selectable element 306, in order to provide the user with the option of entering a review image conversation mode. Furthermore, the unselected selectable element 308 can remain at the interface 304 or be replaced by a different selectable element that identifies a different image conversation mode. The review image conversation mode can cause the automated assistant to provide web reviews at the interface 304 for objects at which the camera is directed. The web reviews can be provided by one or more remote devices that host web data or application data associated with user-submitted reviews of particular objects (e.g., the car). The fact mode, identified in selectable element 308, when selected can cause the automated assistant to provide facts associated with one or more objects in the image. The fact data can also be provided by one or more remote device that host web data and/or application data associated the object. The fact data and/or the web reviews can be presented in an interface element (e.g., similar to the conversation element 318) when the assistant application is operating in the fact image conversation mode or the review image conversation mode and the camera is directed at an object (e.g., the car).

Figure 4:
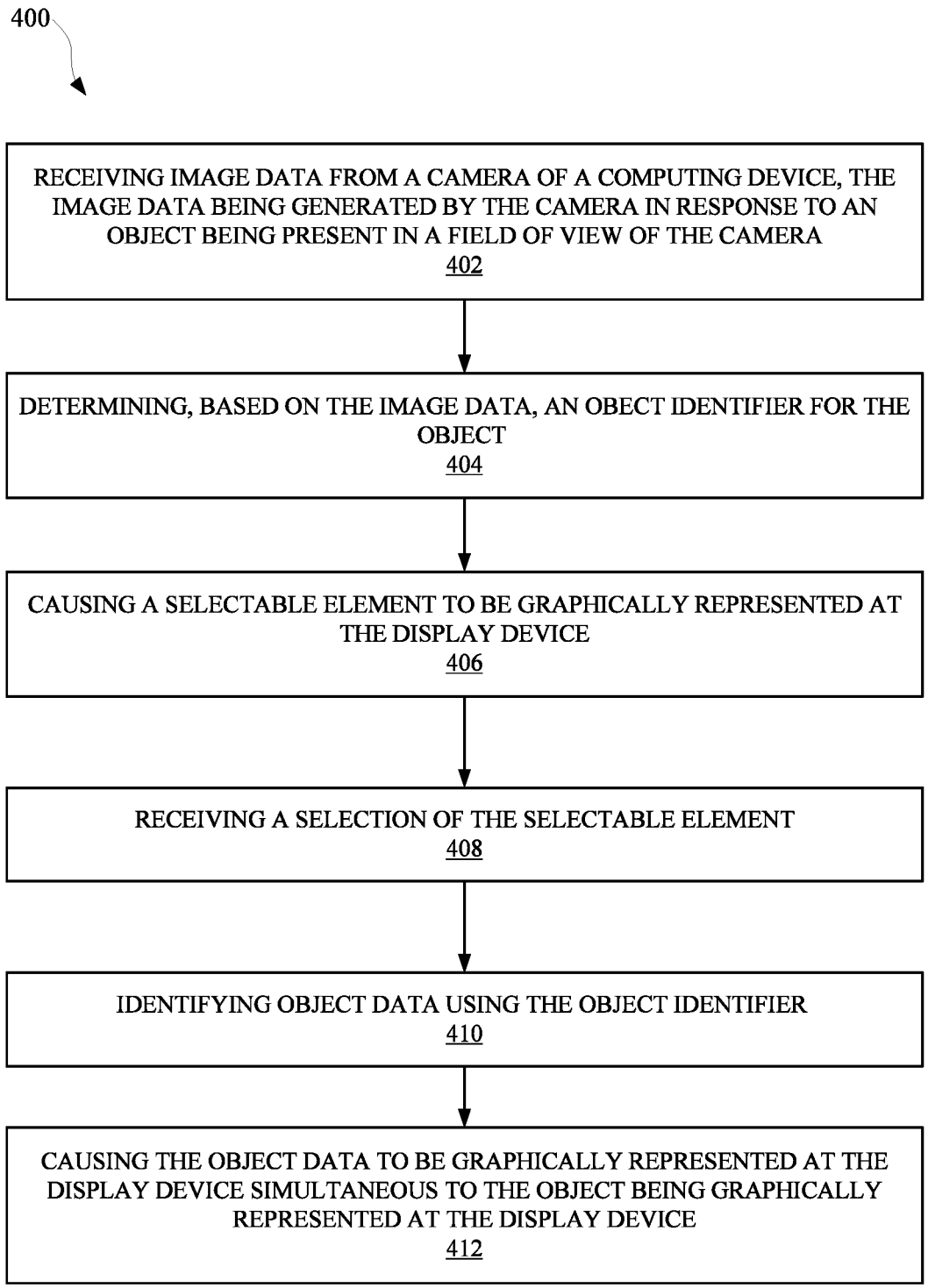
FIG. 4 illustrates a method for interacting with an automated assistant application using image data from a real-time image feed provided by a camera of a computing device.

FIG. 4 illustrates a method 400 for interacting with an automated assistant application using an image from a real-time image feed provided by a camera of a computing device. The method 400 can be performed by a computing device, a server device, and/or any other apparatus suitable for causing data to be presented at a graphical user interface. The method 400 can include a block 402 of receiving image data from a camera of a computing device. The image data being generated by the camera in response to an object being present in a field of view of the camera. The object can be any object that can be captured in an image by a camera. For instance, the object can be a street in a city.

The method 400 at block 404 can include determining, based on the image data, an object identifier for the object. The object identifier can correspond to the object itself (e.g., a street), a component of, or a separate object within the object. For example, the object identifier can identify a restaurant located at the street that is in the field of view of the camera. The object identifier can be generated by the automated assistant or a remote device that has received the image data from the camera. The generation of the object identifier can include an optical character recognition (OCR) algorithm that can identify text within the image data (e.g., the name of the restaurant). Additional and/or alternative image processing techniques can be utilized to generate the object identifier.

The method 400 can further include a block 406 of causing a selectable element to be graphically represented at the display device. The selectable element can identify one or more image conversation modes in which the automated assistant can operate. In some implementations, block 406 includes selecting an image conversation mode based on the object identifier identified at block 404, and causing the selectable element to be graphically represented based on it corresponding to the image conversation mode. The image conversation mode can be selected from a plurality of available image conversation modes. Each image conversation mode can use image data from the camera to elicit data from and/or execute functions of the automated assistant. For instance, the selectable element can include text that identifies a review image conversation mode in which the automated assistant provides web reviews for objects at which the camera of the computing device is directed. In this way, the user does not necessarily have to provide textual or verbal commands to the automated assistant, but rather, can simply direct the camera at different objects to elicit a response.

The method 400 can also include a block 408 of receiving a selection of the selectable element. The selection can be made at a touch interface of the display device, through a verbal command (e.g., "Assistant, please start the review mode"), or a textual command.

At block 410, object data can be identified using at least one object identifier for an object in the image, and the conversation mode that corresponds to the selectable element selected by the selection of block 408. The object identifier for the object can be the same object identifier utilized in block 406 and/or can include an additional object identifier (e.g., an object identifier that identifies the object more granularly than the object identifier utilized in block 406). The automated assistant can identify the object data at the computing device using data available at a memory device of the computing device. Alternatively, the automated assistant can provide one or more queries to one or more remote devices for gathering object data for presenting at the display device. For example, a query can be a search engine query provided to a server that hosts the search engine. Results from the query can include reviews of the object as submitted by other people, and the object data can be identified based on one or more of the results. For instance, when the object is a restaurant, and the automated assistant is operating in the review image conversation mode, the object data can include portions of one or more of the reviews identified by the search engine.

The method 400 at block 412 can include causing the object data to be graphically represented at the display device simultaneous to the object being graphically represented at the display device. In other words, if the camera is directed at the restaurant in the street, and a real-time image feed from the camera is being displayed at the display device, the object data can be presented over the real-time image feed. If the camera is directed at a different object, such as a different restaurant, a separate object identifier for the different restaurant can be generated by the automated assistant or a remote device. The separate object identifier can be used to retrieve reviews or other object data related to the other restaurant, and the reviews or other object data can be presented at the display device automatically.

Figure 5:
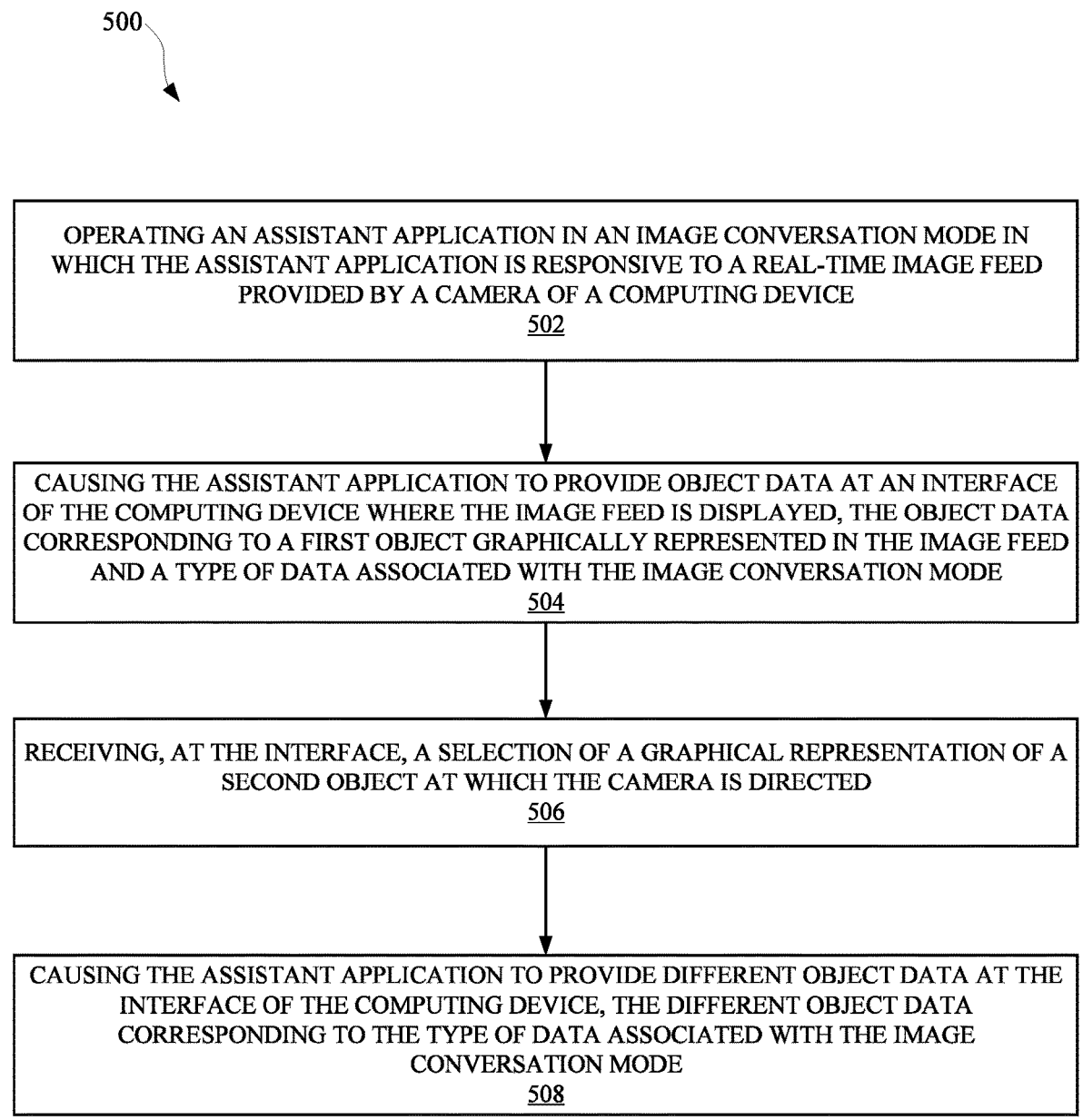
FIG. 5 illustrates a method for providing object data at an interface of a computing device based on an object at which a camera of the computing device is directed.

FIG. 5 illustrates a method 500 for providing object data at an interface of a computing device based on an object at which a camera of the computing device is directed. The method 500 can be performed by a computing device, a server device, and/or any other apparatus capable of processing image-related data. The method 500 can include a block 502 of operating an assistant application in an image conversation mode in which the assistant application is responsive to a real-time image feed provided by a camera of a computing device. The assistant application can be provided at the computing device or otherwise accessible to the computing device. Furthermore, the image conversation mode can be an operating mode that causes the assistant application to provide graphical, audible, or other output in response to the camera being directed at one or more particular objects. For instance, the image conversation mode can be a fact mode in which the assistant application provides facts about an object when a user directs the camera at the object. This can be helpful when the user is on vacation and is interested in their surroundings but may not be comfortable providing multiple verbal or textual queries to their assistant application to receive information about their surroundings.

The method 500 at block 504 can include causing the assistant application to provide object data at an interface of the computing device where the image feed is displayed. The object data can correspond to a first object graphically represented in the image feed and a type of data associated with the image conversation mode. For instance, when the image conversation mode is a fact image conversation mode and the first object is a monument, the assistant application can provide a historical fact about the first object as the object data (e.g., "Construction of the Washington Monument began in 1848."). The object data can be obtained from a remote server that hosts data related to the first object. An identifier for the object can be generated by the assistant application, or a remote device that employs one or more image processing techniques for identifying objects in images. For instance, the image of the first object can be transmitted to an image-based search engine that can receive images and provide web search results from the images. The web search results can include an object identifier (e.g., "the Washington monument"), which can be used by the assistant application to retrieve additional information about the object.

The method 500 at block 506 can include receiving, at the interface of the computing device, a selection of a graphical representation of a second object at which the camera is directed. The selection of the graphical representation can include a tap gesture at a location on the interface where the second object is represented. In some implementations, the selection of the graphical representation can be the user directing the camera at the second object. In this way, the user can seamlessly maneuver the camera to different objects at a location in order to gather data about the different objects. For instance, while the assistant application is operating in the fact image conversation mode, the user can direct the camera at the first object (e.g., the Washington monument) and then redirect the camera toward a second object (e.g., the White House). When the second object appears in the real-time image feed provided by the camera, the second object can be considered selected, at least with respect to the image conversation mode.

The method 500 at block 508 can include causing the assistant application to provide different object data at the interface of the computing device. The different object data can correspond to the type of data associated with the image conversation mode. For instance, when the assistant application is operating in the fact conversation mode and the second object is the White House, the different object data can be a fact about the White House (e.g., "the first Oval Office in the White House was built in 1909."). In some implementations, contextual data related to the camera being direct at the second object can be used as a basis for the object data that is presented to the user. For instance, the contextual data can identify the user as a visitor to the location of the second object, and therefore the assistant application can provide details about what to do at the location while the user is operating the image conversation mode. The contextual data can include a time when the second object is being viewed, and the assistant application can use the time to identify activities to do at or near the second object. For example, when the second object is the White House, and the time is the Monday after Easter, the second object data can include a message such as "Today is the Easter Egg Roll at the White House."

Figure 6:
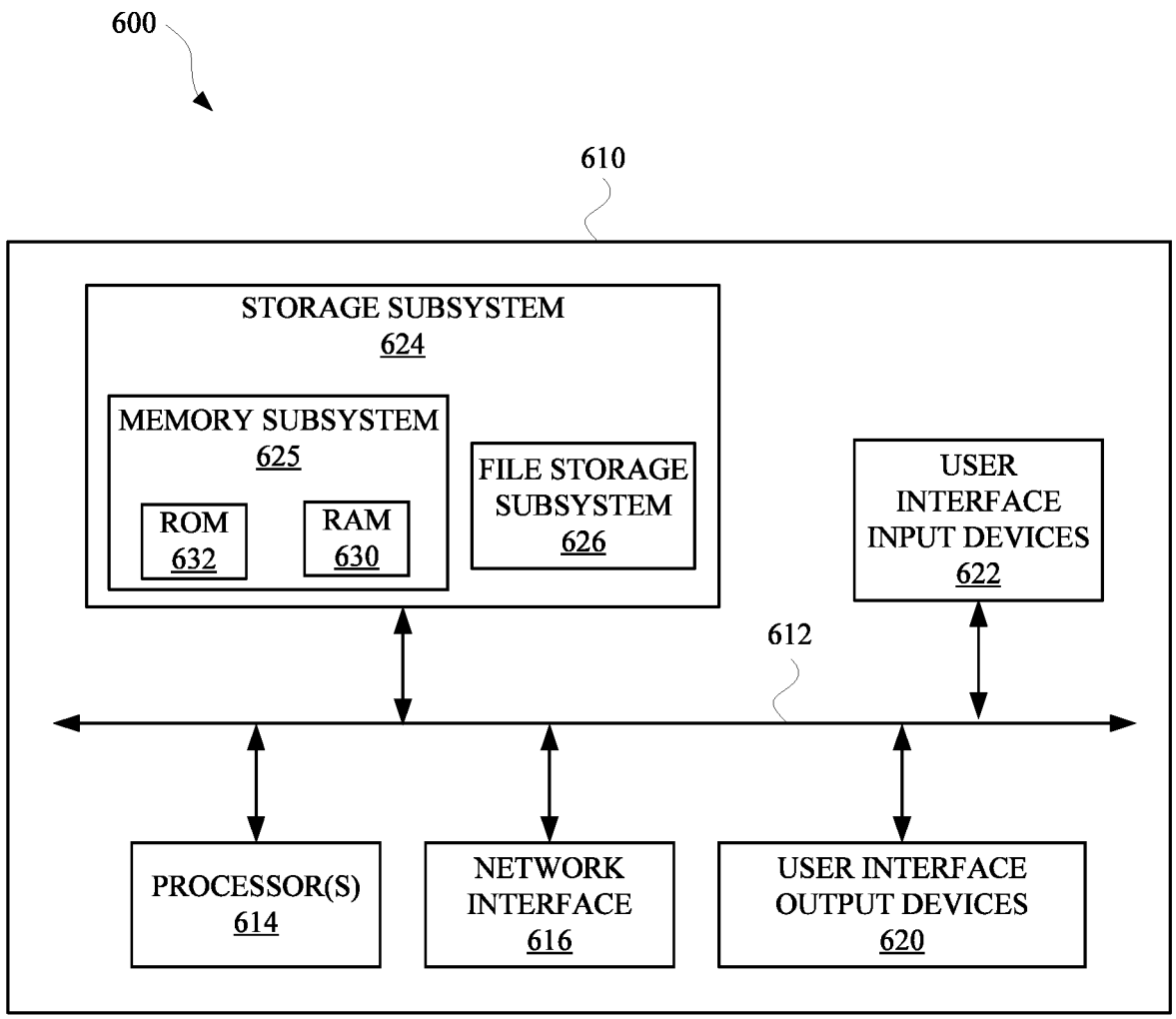
FIG. 6 is a block diagram of an example computer system.

FIG. 6 is a block diagram of an example computer system 610. Computer system 610 typically includes at least one processor 614 which communicates with a number of peripheral devices via bus subsystem 612. These peripheral devices may include a storage subsystem 624, including, for example, a memory 625 and a file storage subsystem 626, user interface output devices 620, user interface input devices 622, and a network interface subsystem 616. The input and output devices allow user interaction with computer system 610. Network interface subsystem 616 provides an interface to outside networks and is coupled to corresponding interface devices in other computer systems.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 610 to the user or to another machine or computer system.

Storage subsystem 624 stores programming and data constructs that provide the functionality of some or all of the modules described herein. For example, the storage subsystem 624 may include the logic to perform selected aspects of method 400, method 500, and/or to implement one or more of the computing device 102, the server device 112, the assistant application 118, the remote device 112, and/or any other application or device discussed herein.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computer system 610 communicate with each other as intended. Although bus subsystem 612 is shown schematically as a single bus, alternative implementations of the bus subsystem may use multiple busses.

Computer system 610 can be of varying types including a workstation, server, computing cluster, blade server, server farm, or any other data processing system or computing device. Due to the ever-changing nature of computers and networks, the description of computer system 610 depicted in FIG. 6 is intended only as a specific example for purposes of illustrating some implementations. Many other configurations of computer system 610 are possible having more or fewer components than the computer system depicted in FIG. 6.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, the method comprising:
    receiving real-time image feed from a camera of a computing device, the real-time image feed capturing one or more images of an object and being received in response to the object being present in a field of view of the camera;
    displaying the real-time image feed at a display device;
    causing one or more selectable elements to be rendered over the real-time image feed at the display device;
    receiving a selection of a selectable element, of the one or more selectable elements, that is rendered at the display device; and
    in response to the selection of the selectable element that is rendered at the display device and without requiring a user to provide spoken input, causing audible output to be rendered at the computing device, the audible output including object data tailored to a conversation mode, out of a plurality of conversation modes, that corresponds to the selectable element, wherein the selectable element identifies the conversation mode in which the object data is generated.

2. The method of claim 1, further comprising:
    identifying, based on processing the one or more images, the object.

3. The method of claim 2, wherein identifying, based on processing the one or more images, the object comprises:
    generating an identifier for the object.

4. The method of claim 1, wherein the object includes a text.

5. The method of claim 4, further comprising:
    comparing a language of the text with a primary dialect setting of the computing device;
    in response to the language of the text being different from the primary dialect setting, providing a translated text at the display device.

6. The method of claim 5, wherein providing the translated text at the display device comprises:
    translating the text; and
    presenting the translated text at the display device.

7. The method of claim 5, wherein prior to providing the translated text, the method further comprises:
    providing a prompt to a user regarding whether to translate the text in a translate mode.

8. The method of claim 1, wherein the object data is further tailored to the object identified from the one or more images in the real-time image feed.

9. The method of claim 1, wherein the selection of the selectable element is received at a touch interface of the display device.

10. The method of claim 1, wherein the audible output is rendered at the computing device while the real-time image feed is displayed at the display device.

11. The method of claim 1, wherein the display device is included in a client device that is different from the computing device.

12. The method of claim 1, wherein the display device is included in the computing device.

13. The method of claim 1, further comprising:
in response to a different object being presented in the field of view of the camera, causing a different selectable element to be rendered over the real-time image feed at the display device.

14. A method implemented by one or more processors, the method comprising:
receiving, by a computing device, a spoken utterance, from a user, that is directed to an automated assistant that is accessible via the computing device;
in response to the spoken utterance:
causing a camera of the computing device to provide a real-time image feed at a display interface of the computing device,
causing the automated assistant to enter a fact mode,
capturing, while the camera is providing the real-time image feed, one or more objects in the real-time image feed of the camera;
determining, based on an image from the real-time image feed, that the camera is directed to an object from the one or more objects;
in response to determining that the camera is directed to the object:
identifying the object, wherein identifying the object is at least based on processing one or more images from the real-time image feed,
generating, based on the automated assistant being in the fact mode, content describing facts of the object, and
causing at least a portion of the content describing facts of the object to be rendered audibly via the computing device.

15. The method of claim 14, wherein the facts of the object is filtered based on a context of the one or more images prior to being included in the natural language content describing facts of the object.

16. The method of claim 15, wherein the context of the one or more images is identified by one or more context identifiers indicative of the context, and wherein the one or more context identifiers include a location where the one or more images were captured.

17. The method of claim 14, wherein the content describing the facts of the object includes natural language content describing the facts of the object and a graphical representation of the object, and the method further comprises:
causing the natural language content describing the facts of the object and the graphical representation of the object to be rendered at the display interface of the computing device.

18. The method of claim 17, further comprising
receiving, at the display interface of the computing device, a selection of the graphical representation of the object, and
causing, in response to receiving the selection of the graphical representation of the object, additional content to be rendered at the display interface of the computing device,
wherein the additional content is associated with the object.

19. The method of claim 14, wherein:
identifying the object comprises generating an identifier for the object, and causing at least the portion of the content describing facts of the object to be rendered audibly via the computing device comprises causing the identifier for the object to be rendered audibly.

20. A method implemented by one or more processors, the method comprising:
receiving, by a computing device, a spoken utterance directed to an automated assistant that is accessible via the computing device;
in response to the spoken utterance:
causing a camera of the computing device to provide a real-time image feed at a display interface of the computing device, and
causing the computing device in a fact mode;
capturing, while the camera is providing the real-time image feed, a first object in the real-time image feed of the camera,
determining, based on the real-time image feed, that the camera is directed to the first object;
in response to determining that the camera is directed to the first object in the real-time image feed of the camera, identifying the first object,
wherein identifying the first object is at least based on processing one or more images from the real-time image feed; and
in response to identifying the first object, generating, based on the computing device being in the fact mode, content describing facts of the first object,
wherein the content changes to describe facts of an additional object when the camera is redirected from the first object to the additional object which causes the additional object to be in a field of view of the camera, and
wherein the additional object is different from the first object.

* * * * *